A. MERK-WIRZ.
DIRECTORY BOARD.
APPLICATION FILED JUNE 18, 1913.

1,132,108.

Patented Mar. 16, 1915.

UNITED STATES PATENT OFFICE.

AUGUST MERK-WIRZ, OF ZURICH, SWITZERLAND.

DIRECTORY-BOARD.

1,132,108.  Specification of Letters Patent.  Patented Mar. 16, 1915.

Application filed June 18, 1913. Serial No. 774,438.

*To all whom it may concern:*

Be it known that I, AUGUST MERK-WIRZ, a citizen of the Republic of Switzerland, residing at Zurich, have invented certain new and useful Improvements in Directory-Boards, of which the following is a complete specification.

This invention relates to improvements in directory boards provided with maps, charts, and such like.

It is an object of the invention to facilitate the finding of certain points on a map and to indicate the location or distance of a selected point with respect to certain other points on the map, and particularly with respect to that point which corresponds to the location where the selection is made. Even persons who have experience in reading maps and charts are not always enabled to find their way through streets of a large city, for it is necessary in order to interpret a map with respect to the surrounding territory to find on which point of the map the reading party is located.

It is another object of the invention to form a readily readable substitute for travelers' guides and charts, so as to make travelers' hand-books and guides and similar auxiliary means unnecessary.

The present invention is not only adapted for facilitating the finding of the location of certain parts in a large city, but may also be used to facilitate the reading of other plans, as those of exposition parks, amusement parks, railroad maps and such like.

The reading, or finding of a certain selected locality on the map is facilitated by making the respective point on the map conspicuous with respect to other portions of the map, and it is, therefore, an object of the present invention to differentiate certain points or portions of the map with respect to other portions. In order to facilitate the finding of one of a plurality of certain points or localities means must be provided for selectively differentiating these points on the map from the other parts thereof. In the present case electric illumination serves for rendering the selected portion different from the other portion of the map, and it is advisable to indicate on the map that point of the city, park, line or the like, where the respective map is located by an illumination different in color or outline from the illumination of the selected points.

With these and other objects in view, I have illustrated in the accompanying drawing an embodiment of the invention.

Figure 1:
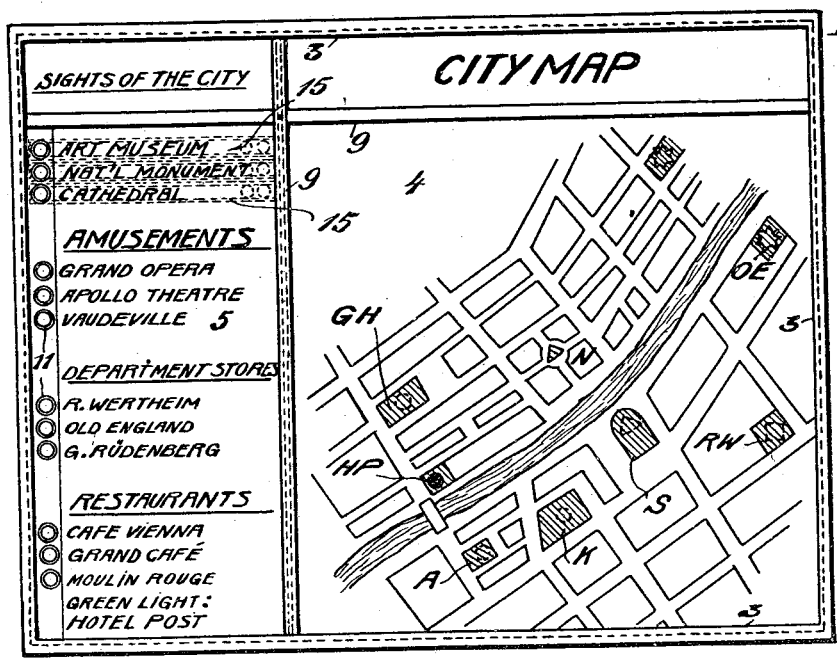
Figure 2:
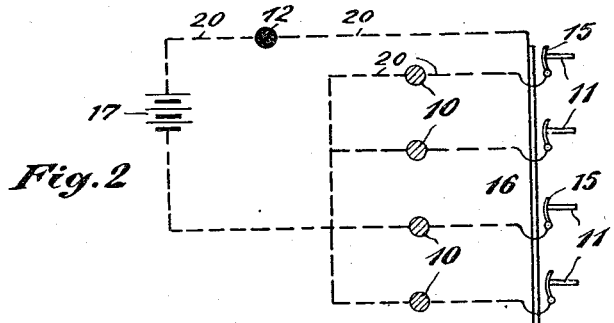
Figure 3:
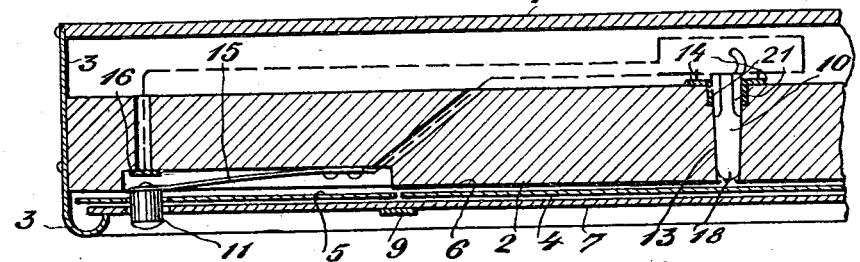

Figure 1 shows in front elevation a directory board, provided with a map of a city or town. Fig. 2 is a diagram of the circuit for the illuminating means, and Fig. 3 is a horizontal section through the directory board.

A map 4 is supported within a frame, which comprises a back plate 1 and frame members 3, at the sides, the top and the bottom thereof, the frame members 3 preferably being made of sheet metal. They are secured to the back plate 1 and to a relatively stout board 2. These lateral and end frame members 3 also serve for holding a glass plate 7 for purposes which will be described later.

On the right-hand part of the board 2, the map 4 of the city proper is supported. The left-hand part of said board serves as a switch-board and is provided with a list, of those localities in the city which may be selectively differentiated from the remaining parts of the map. It is advisable to indicate on the map those localities in a manner different from the indication of the other parts, as, for instance, by showing these localities shaded or in cross-hatching, and also to provide reference characters with leaders pointing to the selectable portions. For instance, G. O. may indicate "Grand Opera." V may indicate "Vaudeville." N may indicate "National Monument." and so on. This list 5 preferably is subdivided into groups, each group having an appropriate heading, as for instance: "Sights." "Amusements," "Department Stores," "Restaurants."

A part on the map of particularly conspicuous shading indicates that portion of the town, park, or the like, on which the directory board is located. This may, for instance, be a hotel, and it may also be provided with a suitable reference character like "H. P." (for Hotel Post) or such like.

The map 4 preferably is printed, or otherwise reproduced on translucent material, like thin paper. The parts of the map which are to be illuminated selectively differ from the remaining parts, by shading, or by a different color, or such like. It is advisable to interpose between the map 4 and the board 2 a sheet of opaque paper 6, said sheet being provided with apertures underlying those portions of the map which are adapted for selective differentiation. The glass pane 7 is held in place by the frame 3, and also by metal strips 9, as shown in Figs. 1 and 3.

The selective differentiation of certain points on the map is effected by illumination, and for each of these points, therefore, a source of light 10, preferably in the form of an incandescent lamp, is provided. The circuit containing this source of light is closed when a switch, preferably in the form of a push button 11, is actuated. The push buttons 11 are placed adjacent the designations of the selectable localities on the list 5, as may be clearly seen from Fig. 1.

The place where the directory board itself is located is also indicated by a lamp 12, (Fig. 2) and it is advisable to use a lamp of different color for the indication of the standing place of the board. The lamps for indicating the selected points may, for instance, be red, and the lamp indicating where the table is located or the point of selection is indicated may be green.

The lamps 10 or 12 preferably are of conical shape, as lamps of this kind may easily be inserted in suitable apertures underlying the selectable points of the map. These apertures are indicated at 13 in Fig. 3, and the lamps are inserted from the rear through these apertures so that their pointed or narrow tip 18 is adjacent to or projects through the aperture on the opaque sheet of paper 6 and is immediately below the respective point of the map 4. It is advisable to effect the connection of the conductors 20 in the circuit with the lamp 10 or 12 by means of terminal plates 14 fixed adjacent to aperture 13, and adapted to enter into contact with lateral terminals 21 of the lamp, as may be clearly seen from Fig. 3.

The switches in the embodiment shown comprise springs 15, which carry the push buttons 11, said springs being permanently connected with one of the conductors 20 leading to a lamp. The source of electric energy here shown in form of a battery is connected with a bus bar 16 and if a button is depressed the circuit through battery, bus-bar, spring 15, and selected lamp is established.

As may be seen from Fig. 2 the lamp 12 indicating the point of selection is inserted into the circuit whenever any of the switches 11 are closed so that upon depression of a push button not only the selected point is indicated on the map, but also the point of selection. It may also be understood that the intensity of illumination of the selected point is very strong, as the tip of the lamps is immediately underneath said point; the other part of the lamp being inclosed and covered by the supporting board 2.

The operation of the device may readily be understood from the following example:

A person desiring to find the location of a department store called "Old England" depresses the push button 11 adjacent the designation "Old England" in the group of "Department Stores," so that the lamp 10 controlled by this button is supplied with current and illuminates a certain point on the map, which point also carries the designation "O. E." At the same time, however, the location of the point of selection, as, for instance, the Hotel Post is made conspicuous and differentiated by the illumination of the green lamp 12 and in this way, upon depression of a button, or other similar means, the location of the selected point, as well as the direction which has to be followed to get to this point from the point of selection is indicated immediately.

It is also advisable to indicate approximately by suitable means the distance of the selected point from the point of selection. For this purpose, all the lamps indicating localities within a certain radius from the point of selection have one color, different from the color of the lamp corresponding to the point of selection; lamps indicating localities within a larger radius are designated by another color and so forth. For instance, white lamps may serve for indicating the selectable points which are within a radius of one mile from the point of selection, red lamps should indicate those which are two miles, blue lamps serving for indicating those points which are at a distance of three miles, yellow lamps indicating points which are four miles from the point of selection, etc., the point of selection being indicated by a lamp different in color from all others.

Another way of indicating the distance between the point of selection and a selected point may be had by providing the interposed sheet 6 with apertures which differ in their outline from each other in accordance with the distance of the respective point from the point of selection. The apertures through which the light is made visible to the spectator may be of circular shape, triangular shape, square shape, etc., in accordance with the distance from the point of selection.

The conical shape of the lamp is preferred, because a larger number of localities may be illuminated thereby within a relatively small space than if ordinary lamps of pear shape or cylindrical lamps would be used.

In railroad maps the various lines leading to a distant point may be indicated by illumination of the points through which the lines pass. A party desiring to travel from New York to Chicago may, therefore, upon depression of the push button corresponding to the Erie Railroad find out through which cities the Erie Railroad passes, as compared with the New York Central Line, which last named line may also be differentiated upon selection from the other lines in a similar manner.

It is also possible to produce an illumination in different colors by interposing small transparent plates of different colors under the selectable point of the map. It is obvious also that the directory board must not necessarily be placed adjacent the list but may be disposed in some other locality at the point of selection.

I claim:

1. In a directory board, the combination of a chart or map, a table showing a list of certain points on the map, and means actuatable by a single operation in coaction with a table for visibly differentiating a plurality of points on the map with respect to other points thereon.

2. In a directory board, the combination of a chart or map with a table containing a list of points shown on the map, said list being subdivided into groups, and electrical means actuatable by a single operation coacting with said table for visibly differentiating a plurality of points on the map with respect to other points thereon.

3. In a directory board, the combination of a chart or map with means for selectively differentiating certain points on the map with respect to other points thereon in a predetermined way and for differentiating another point of the map from the selected point in another predetermined way, said other point on the map corresponding to the locality at which the selection is made.

4. A directory board, comprising in combination a chart or map, means for selectively differentiating certain points on a map or chart from other points thereon, and for differentiating another point from the selective points, said other point indicating the location of the directory board.

5. A directory board comprising in combination a chart or map, means for selectively differentiating certain points on the map by illuminating said points and for illuminating at the same time the point corresponding to the locality at which the selection is made on the map.

6. A directory board comprising in combination a chart or map, means for selectively illuminating certain points on the map and for illuminating at the same time the point corresponding to the locality at which the selection is made in a light different from the selective point.

7. A directory board comprising in combination a chart or map, an opaque background for said chart or map, a board on which said background is mounted, apertures in said background and board, lamps in said apertures and means for selectively supplying said lamps with electric current.

8. A directory board, comprising in combination a chart or map made of translucent material, a background and background board for said background, tapering apertures extending through said board, conical incandescent lamps exchangeably secured in said apertures, and means for selectively supplying electric current to said incandescent lamps.

9. A directory board comprising in combination a chart or map, means for illumination a point on said map in a certain color, said point corresponding to the point of location of the directory board and means for selectively illuminating other points on said map in colors different from each other and different from the color in which the point of location of the directory board is illuminated.

In testimony whereof I affix my signature in presence of two witnesses.

AUGUST MERK-WIRZ.

Witnesses:
 JOHANNES AUMUND,
 Dr. MAX LAUTENBACH.